United States Patent
Xue

(10) Patent No.: US 7,454,537 B1
(45) Date of Patent: Nov. 18, 2008

(54) SYNCHRONIZATION AND CHANNEL DESKEWING CIRCUITRY FOR MULTI-CHANNEL SERIAL LINKS

(75) Inventor: Ning Xue, Fremont, CA (US)

(73) Assignee: Altera Corporation, San Jose, CA (US)

( * ) Notice: Subject to any disclaimer, the term of this patent is extended or adjusted under 35 U.S.C. 154(b) by 609 days.

(21) Appl. No.: 10/830,356

(22) Filed: Apr. 22, 2004

(51) Int. Cl.
- G06F 3/00 (2006.01)
- G06F 5/00 (2006.01)
- G06F 1/12 (2006.01)
- G06F 13/42 (2006.01)

(52) U.S. Cl. .................... 710/52; 713/400; 713/503
(58) Field of Classification Search ............. 710/52, 710/53, 54, 55, 56, 57; 713/400, 503
See application file for complete search history.

(56) References Cited

U.S. PATENT DOCUMENTS

| | | | | |
|---|---|---|---|---|
| 5,917,482 A * | 6/1999 | Putnam | ....................... | 715/748 |
| 6,134,155 A * | 10/2000 | Wen | ....................... | 365/189.04 |
| 6,512,804 B1 * | 1/2003 | Johnson et al. | ............. | 375/372 |
| 6,578,092 B1 * | 6/2003 | Lau et al. | ....................... | 710/29 |
| 6,678,813 B1 * | 1/2004 | Le | .............................. | 711/172 |
| 6,782,461 B2 * | 8/2004 | Lam | .............................. | 711/170 |
| 7,093,061 B2 * | 8/2006 | Teo | ............................... | 711/101 |
| 7,191,162 B2 * | 3/2007 | Gibbs et al. | .................... | 706/16 |

OTHER PUBLICATIONS

John D'Ambrosia "XAUI: An Overview" version 1.0, Mar. 2002, from www.10gea.org (10 Gigabit Ethernet Alliance).
"ORCA ORSO82G5" Data Sheet of Lattice Semiconductor Corporation, Jan. 2004.
"ORCA ORT42G5 and ORT82G5" Data Sheet of Lattice Semiconductor Corporation, Jan. 2004.
"RocketIO X Transceiver User Guide"UG035 (v1.2.1), Dec. 16, 2003 (data sheet of Xilinx Corporation).

* cited by examiner

*Primary Examiner*—Tariq Hafiz
*Assistant Examiner*—Michael Sun
(74) *Attorney, Agent, or Firm*—Treyz Law Group; G. Victor Treyz

(57) ABSTRACT

The capacity of a single high-speed serial link between programmable logic devices or other integrated circuits may be provided using multiple lower-speed serial links arranged in parallel. Circuitry is provided for synchronizing and deskewing serial data streams from the multiple lower-speed serial links. At a receiving integrated circuit, a first-in-first-out buffer may be associated with each of the lower-speed serial links. Each first-in-first-out buffer may be used to provide both synchronization functions and channel alignment functions.

12 Claims, 12 Drawing Sheets

|  | CH 0 | CH 1 | CH 2 | CH 3 |
|---|---|---|---|---|
| CLK=0 | wptr0=N/A<br>(empty)<br>rdptr0=1 | wptr1=N/A<br>(empty)<br>rdptr1=1 | wptr2=1<br>A<br>rdptr2=1 | wptr3=N/A<br>(empty)<br>rdptr3=1 |
| CLK=1 | wptr0=1<br>A<br>rdptr0=1 | wptr1=N/A<br>(empty)<br>rdptr1=1 | wptr2=2<br>A<br>dat0<br>rdptr2=1 | wptr3=1<br>A<br>rdptr3=1 |
| CLK=2 | wptr0=2<br>A<br>dat0<br>rdptr0=1 | wptr1=1<br>A<br>rdptr1=1 | wptr2=3<br>A<br>dat0<br>dat1<br>rdptr2=1 | wptr3=2<br>A<br>dat0<br>rdptr3=1 |
| CLK=3 | wptr0=3<br>A<br>dat0<br>dat1<br>rdptr0=1 | wptr1=2<br>A<br>dat0<br>rdptr1=1 | wptr2=4<br>A<br>dat0<br>dat1<br>dat2<br>rdptr2=1 | wptr3=3<br>A<br>dat0<br>dat1<br>rdptr3=1 |
| CLK=4 | wptr0=4<br>A<br>dat0<br>dat1<br>dat2<br>rdptr0=2 | wptr1=3<br>A<br>dat0<br>dat1<br>rdptr1=2 | wptr2=5<br>A<br>dat0<br>dat1<br>dat2<br>dat3<br>rdptr2=2 | wptr3=4<br>A<br>dat0<br>dat1<br>dat2<br>rdptr3=2 |

(PRIOR ART)

FIG. 6

SYNCHRONIZATION AND CHANNEL DESKEWING CIRCUITRY FOR MULTI-CHANNEL SERIAL LINKS

BACKGROUND OF THE INVENTION

This invention relates to serial communications interfaces, and more particularly, to circuitry for synchronizing and deskewing multi-channel serial communications links between integrated circuits such as programmable logic devices.

Serial communications formats are often used in modern electronics systems. Serial communications can be faster than parallel communications, use fewer pins, and, particularly when differential signaling schemes are used, can have higher noise immunity.

It can be challenging to handle serial data streams at high data rates (e.g., at data rates above several Gbps). As a result, it is often advantageous to support high-speed serial data communications using multiple smaller serial data paths operating in parallel. For example, 10 Gbps Ethernet communications can be supported using four parallel 3.125 Gbps serial paths using a XAUI interface and an OC-192 SONET channel can be transmitted over four parallel OC-48 channels.

In a high-speed serial link composed of multiple lower-speed serial channels, each lower-speed channel is subject to a different environment due to variations in chip layouts, pin locations, signal paths, thermal conditions, etc. As a result of these different environments, signals travel over each of the lower-speed serial channels differently. At the receiving end of the link, the lower-speed parallel serial channels must be deskewed and synchronized.

Conventional arrangements for deskewing and synchronizing the lower-speed channels involve the use of two sets of first-in-first-out (FIFO) buffers. Data is first deskewed using deskewing FIFO and is then synchronized using synchronization FIFO.

A two-stage deskew-synchronization FIFO arrangement uses a fixed amount of FIFO resources for deskewing and for synchronization. The size of the deskew FIFO limits the amount by which the earliest-arriving channel can lead the latest-arriving channel. The size of the synchronization FIFO determines how much clock wander is permitted between the recovered clocks from each channel and the common clock used by the receiving circuit.

Both the deskew FIFO and the synchronization FIFO must have sufficient capacity to tolerate worst-case conditions. This tends to make the FIFOs large. Moreover, the sizes of conventional FIFOs are fixed, which can make conventional FIFO arrangements inflexible.

SUMMARY OF THE INVENTION

In accordance with the present invention, serial communications circuitry is provided for supporting multi-path serial communications links. The circuitry may be provided as part of a programmable logic device or other integrated circuit.

The serial communications circuitry may use a single set of FIFO buffers at the receiving end of a serial link to perform both synchronization and deskewing functions. This approach allows the amount of FIFO resources that are allocated to deskewing and synchronization functions to be dynamically partitioned. When synchronization functions require small amounts of FIFO, the FIFO space available for channel deskewing functions will be larger, so that larger amounts of channel skew can be tolerated. When synchronization functions require large amounts of FIFO, less FIFO may be allocated for deskewing and more FIFO may be allocated for synchronization. Because the FIFO may be partitioned dynamically, FIFO resources may be allocated in a way that is specifically tailored for a particular serial communications environment.

Further features of the invention, its nature and various advantages will be more apparent from the accompanying drawings and the following detailed description of the preferred embodiments.

BRIEF DESCRIPTION OF THE DRAWINGS

FIG. 6 is a diagram showing how four conventional deskewing FIFOs may be used to deskew four corresponding serial channels.

DETAILED DESCRIPTION OF THE PREFERRED EMBODIMENTS

The present invention relates to serial communications circuitry and methods for using serial communications circuitry. In particular, the present invention relates to serial communications schemes in which a relatively higher-rate serial link is formed from multiple parallel relatively lower-rate serial links. For example, four serial links operating at about 3.125 Gbps may be used in parallel to support the functions of a 10 Gbps Gigabit Ethernet serial link. This is merely one illustrative configuration. The data streams from any number of lower-rate serial channels may be combined to form a higher-rate serial link. The present invention will sometimes be described in the context of a four-path arrangement. This is, however, merely illustrative.

Figure 1:
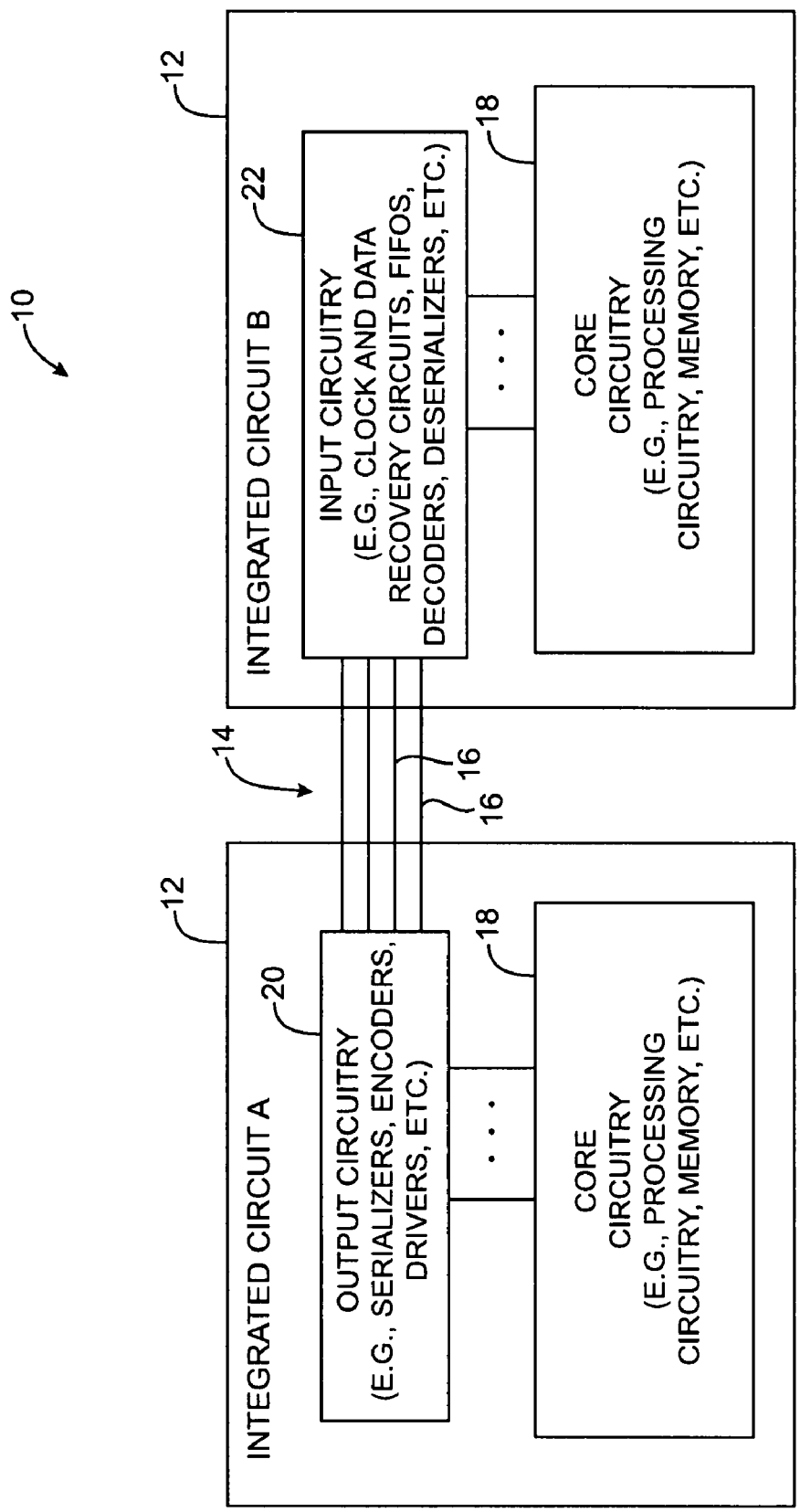
FIG. 1 is a schematic diagram showing how two integrated circuits can communicate over a serial communications link made up of four smaller serial links arranged in parallel in accordance with the present invention.

Illustrative equipment 10 having two integrated circuits 12 that communicate over a serial communications path 14 is shown in FIG. 1. The integrated circuits 12 may be used in any suitable electronics equipment. For example, each integrated circuit 12 may be mounted on a different line card connected to a common system backplane in rack-mounted data processing or telecommunications equipment. As another example, integrated circuits 12 may be mounted on the same card or may be used in other types of electronic equipment. Each integrated circuit 12 may be, for example, a programmable logic device, a microprocessor, a digital signal processor, an application-specific integrated circuit (ASIC), etc.

Serial link 14 is generally a high-speed link having a data rate of many Gbps. Link 14 is made up of a number of slower parallel serial links 16. Each link 16 may, for example, be a differential signal path having a pair of conductors that support communications at a serial data rate of a few Gbps. The use of multi-path serial links such as link 14 to support communications between chips in an electrical system helps to overcome some of the difficulties associated with handling single-link serial data streams at extremely high data rates (e.g., 10 Gbps), because the links 16 have lower data rates than would be required if all of their serial data were passed through a single pair of differential signal conductors.

However, because each link 16 may be connected and routed differently through equipment 10, the data streams on links 16 tend to become skewed with respect to each other (i.e., the data bits in one stream will be received at a time that is shifted ahead or behind the data bits of another stream). Moreover, the different environments of each link 16 will typically cause the data streams on each link to fall out of synchronization with each other. The clock associated with each link 16 tends to be influenced by environmental factors during transmission. As a result, even if a common clock is used to transmit the signals over links 16, the clocks for links 16 will no longer be identical when they are received (i.e., the links 16 will no longer be synchronized).

In general, integrated circuits such as circuits 12 of FIG. 1 may have only transmitting circuitry, may have only receiving circuitry, or may have both transmitting and receiving circuitry. In the example of FIG. 1, integrated circuit A has core circuitry 18 that generates data. Output circuitry 20 is used to transmit the data from circuitry 18 to integrated circuit B over the multiple parallel links or paths 16 of serial link or path 14.

At the receiving end of link 14, input circuitry 22 is used to receive the transmitted data. The input circuitry 22 includes first-in-first-out (FIFO) buffer circuitry for deskewing and synchronizing the incoming data on the parallel links 16. The resulting data is provided to core circuitry 18 on integrated circuit B. Core circuitry 18 may be any type of circuitry, including programmable logic, microprocessor circuitry, digital signal processor circuitry, processing circuitry that is part of an application-specific integrated circuit, memory circuitry, etc.

Figure 2:
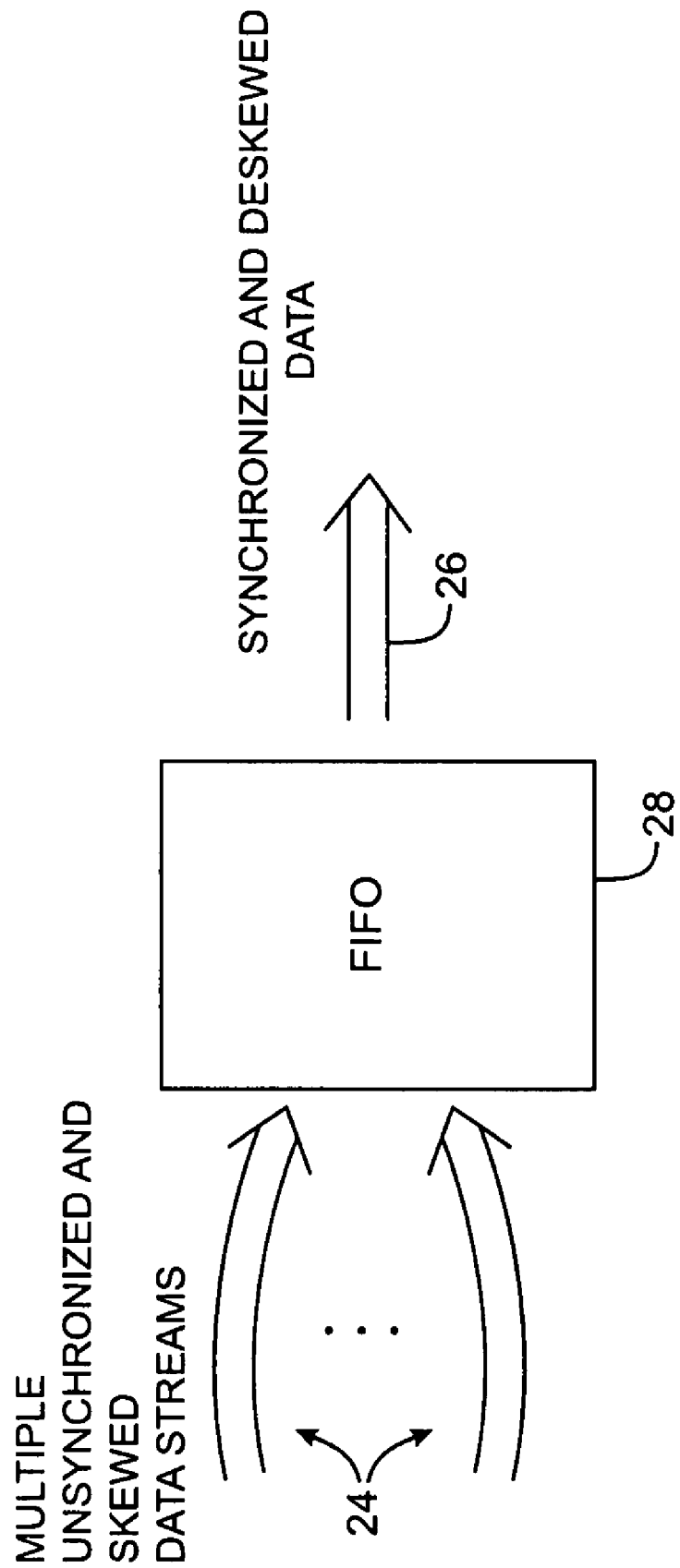
FIG. 2 is a diagram showing how multiple unsynchronized and skewed data streams can be deskewed and synchronized using first-in-first-out (FIFO) resources in accordance with the present invention.

The diagram of FIG. 2 shows how multiple parallel streams of data from respective serial paths 16 may be deskewed and synchronized to produce deskewed and synchronized data 26 using FIFO circuitry 28. In accordance with the present invention, a single set of FIFO buffers in which one buffer is associated with each incoming data stream 24 may be used to perform both deskewing and synchronization functions. Performing both deskewing and synchronization in the same FIFO is more efficient than using multiple cascaded FIFOs, because FIFO resources need not be over-allocated to handle both worst-case deskewing and worst-case synchronization scenarios. Moreover, fewer circuit resources are generally required to handle a single set of FIFO buffers than would be required to handle two sets of FIFOs. For example, fewer gates are typically required to handle FIFO pointers when there is only a single set of FIFO buffers.

Figure 3:
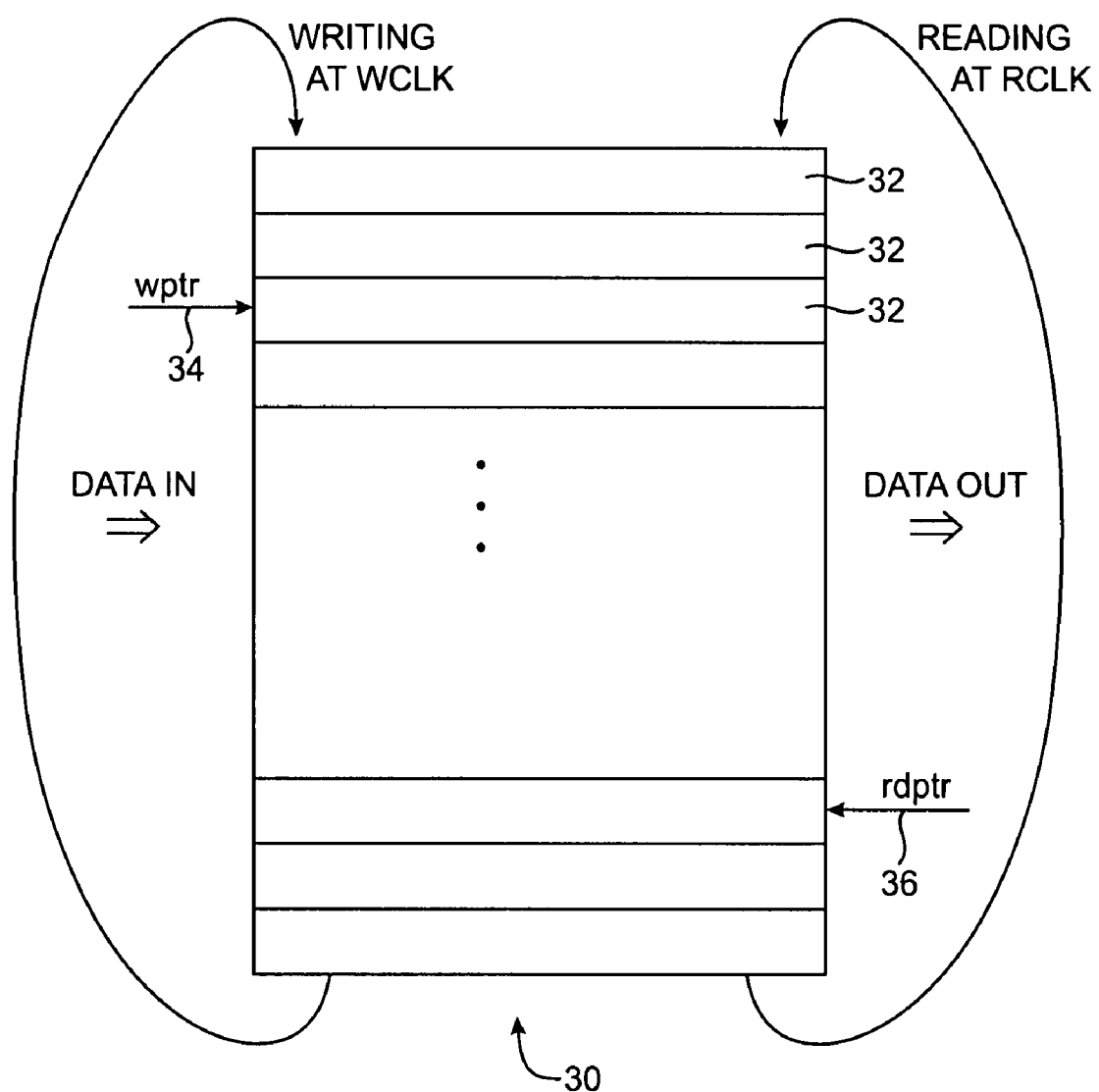
FIG. 3 is a diagram of an illustrative FIFO buffer in accordance with the present invention.

An illustrative FIFO buffer or memory, sometimes simply referred to as a "FIFO," is shown in FIG. 3. As shown in FIG. 3, FIFO 30 has a number of memory locations 32. During synchronization and deskewing operations, incoming data (data in) from one of the serial data paths 16 is written into a corresponding FIFO 30. A sequentially-incremented write pointer 34 points to the memory location 32 in the FIFO 30 where the incoming data is being written (typically in multi-bit words). Concurrently, data is being read from each FIFO 30 to produce a corresponding data out stream. A sequentially-incremented read pointer 36 points to the memory location in the FIFO 30 from which the data is being read. The write pointer and read pointers can be controlled independently, using different clocks and different write and read speeds, so each FIFO 30 serves to decouple its incoming data stream from its outgoing data stream.

Figure 4:
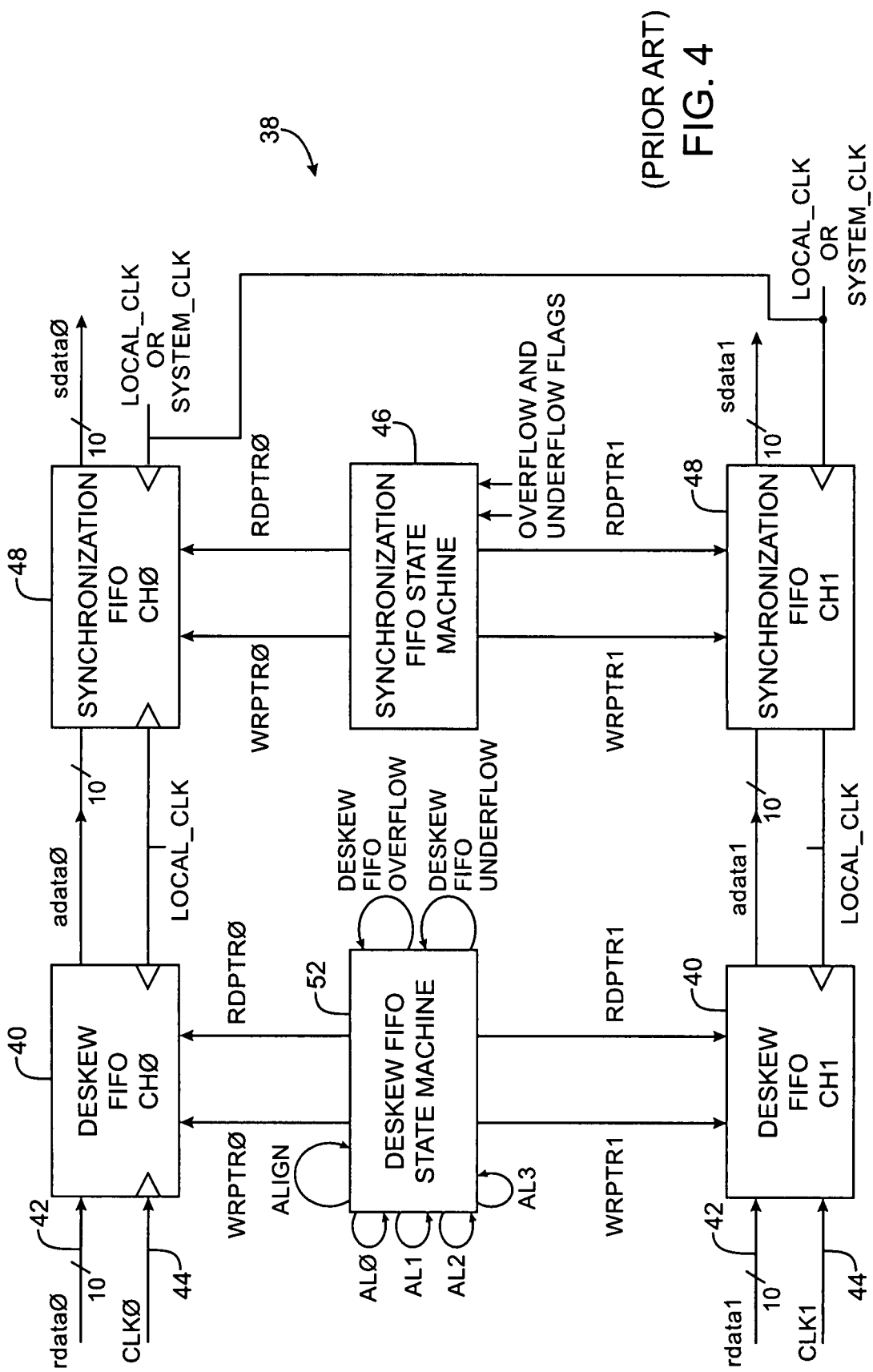
FIG. 4 is a diagram showing how conventional circuit arrangements use separate deskewing FIFO and synchronization FIFO to deskew and synchronize serial data streams.

A conventional serial communications circuit 38 that uses two sets of FIFOs to deskew and synchronize parallel streams of incoming serial data is shown in FIG. 4. Incoming serial data streams from respective serial data paths are received at respective clock-and-data recovery circuits (not shown). Each clock-and-data recovery circuit produces a recovered clock and recovered data from the serial data stream. Word alignment circuits are then used to align the data bits in each word of data. As shown in FIG. 4, in channel 0, the recovered clock is clk0 and the recovered and word-aligned raw data is rdata0. These signals are applied to deskew FIFO 40 via paths 42 and 44. Data is written into deskew FIFO 40 at a rate determined by clk0. The other channels—channels 2 and 3—are identical to channels 0 and 1, but only the detailed circuitry for channels 0 and 1 is shown in FIG. 4 to avoid over-complicating the drawing.

Because the lower-speed channel data streams must be combined to reconstruct a unitary high-speed channel, deskewing functions are performed after word alignment. Before passing through the deskewing FIFOs 40, the four data streams rdata0-rdata3 are each in their own recovered clock domains and one channel may be ahead of the others in time. The word-aligned data is written into deskew FIFO 40 in each recovered clock domain. (For example, rdata0 is written into deskew FIFO in clk0.) The read clock for each FIFO 40 must be a common clock so that the output of the deskew FIFOs 40 can be processed together. The read clock rate must generally be within a narrow speed variance from the write clock to allow the deskewing FIFO to work. If this condition is not satisfied, the deskewing FIFO 40 will experience either overflow or underflow most of the time, thereby preventing the deskewing functions from being properly executed. Because the recovered clocks are derived from each channel's data, which originated from one clock source in transmission, the read clock for deskew FIFO read operations is generally a local clock selected from one of the channel recovered clocks. Because there are four parallel serial channels, there are four deskew FIFOs.

Deskewing operations rely on the simultaneous aligned insertion of alignment characters in the four parallel outgoing data streams at the transmitter. These alignment characters are detected at the receiver and used to reconstruct an aligned data stream.

A deskewing FIFO state machine 52 is used to control the four parallel deskewing FIFOs 40. The deskewing FIFO state machine 52 monitors the data on paths 42. When an alignment character is detected in a given path, a corresponding alignment flag is taken high. For example, if an alignment character is detected in channel 2, the flag AL2 is taken high. The state machine 52 controls the write pointers for each FIFO 40, so that data is initially not written into the deskewing FIFOs 40 until alignment has been achieved across all channels. At this point an alignment flag ALIGN is set high and reading is commenced using a common read pointer.

The deskew FIFOs generate deskew overflow and underflow flags, to inform deskewing state machine 52 when each FIFO 40 is in danger of overflowing or underflowing.

The deskewing operation performed by the deskewing FIFO state machine and its four associated deskew FIFOs is illustrated in the example of FIG. 6.

At clock cycle 0 (local clock CLK=0), an alignment character "A" has been received in channel 2. The state machine 52 therefore sets AL2=1 and wptr2=1, so that the alignment character is written into the first memory location in the deskew FIFO for channel 2, as shown in FIG. 6.

At clock cycle 1, alignment characters are received in channels 0 and 3. The write pointers wptr0 and wptr3 are therefore set to 1 and wptr2 is set to 2. No alignment character has yet been received in channel 1, so the write pointer for channel 1 (wptr1) is not yet valid. Moreover, because the channels are not yet aligned, the read pointer is not yet allowed to increment (i.e., it is not valid).

At clock cycle 2, an alignment character is received in channel 1. The value of wptr1 is therefore set to 1 and the alignment character is written into the first memory location in the deskew FIFO for channel 1, as shown in FIG. 6. The write pointers in the other channels are also incremented, so that data from those channels is written into appropriate memory locations.

Now that alignment characters have been received in all channels, deskewed data can be read out of the four FIFOs in parallel. This is accomplished by allowing the read pointer rdptr to increment from 1 to 2, (and subsequently to 3, etc.), as shown in the rows of FIG. 6 labeled "clk=3" and "clk=4." At the same time, new data is written into the correct locations in the deskewing FIFOs by incrementing the write pointers for each channel.

After being deskewed, the deskew FIFO outputs have been word aligned and channel aligned. The deskewed data is still clocked using a local clock that has been selected from one of the recovered clocks. Many applications require transferring this data rate to a system clock rate, which is used for further processing. For example, if this data is being sent into the core logic of a programmable logic device, the modules in the programmable logic device may have their own clocks. In this situation, the local clock domain needs to be changed to a system clock domain using synchronization FIFO 48.

Because there are four parallel serial channels, there are four synchronization FIFOs 48 in circuitry 38. These FIFOs operate in parallel. Data is generally written into each synchronization FIFO 48 according to the local FIFO read clock (e.g., recovered clk 0 from channel 0). Data is generally read from the FIFOs 48 using a system clock (i.e., a user-desired clock derived from the downstream processing modules in the programmable logic device).

A synchronization FIFO state machine 46 controls the operation of each of the synchronization FIFOs 48 by controlling the write pointers and read pointers in each channel. The FIFOs 48 generate overflow and underflow flags that inform the synchronization FIFO state machine 46 when the FIFO 48 is in danger of experiencing an overflow or underflow condition.

Figure 5A:
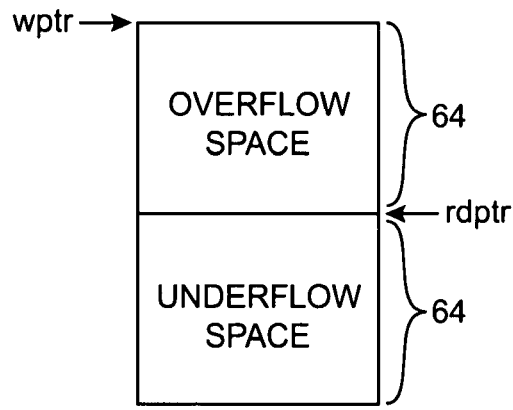
FIG. 5a is a diagram of a conventional FIFO synchronization buffer showing the initial locations of its write and read pointers.

A typical FIFO 48 may have 128 storage locations (memory slots), each of which can store a respective piece of data (i.e., a "word" or "byte" of data). Using a conventional partitioning arrangement, half of the synchronization FIFO space is allocated to handling underflow (i.e., it is allocated to underflow space) and half of the synchronization FIFO space is allocated to handling overflow (i.e., it is allocated to overflow space). This type of arrangement is shown in FIG. 5*a*. The write pointer in this example is initially set to write into memory location 0 and the read pointer is initially set to read from memory location 64, which is half of the size of the 128-slot FIFO.

Figure 5B:
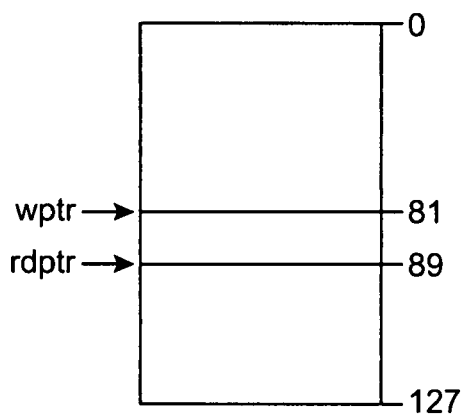
FIG. 5b is a diagram of a conventional FIFO synchronization buffer showing the locations of its write and read pointers on the verge of an overflow condition during synchronization operations.

If the local clock is faster than the system clock (even if just for a limited time), the rate at which data is being written into FIFO 48 can exceed the rate at which data is being read from FIFO 48. As a result, the write pointer will start to overtake the read pointer, as shown in FIG. 5*b*. If the write pointer were to completely overtake the read pointer, the FIFO would experience overflow and a full FIFO of data would be lost.

Figure 5C:
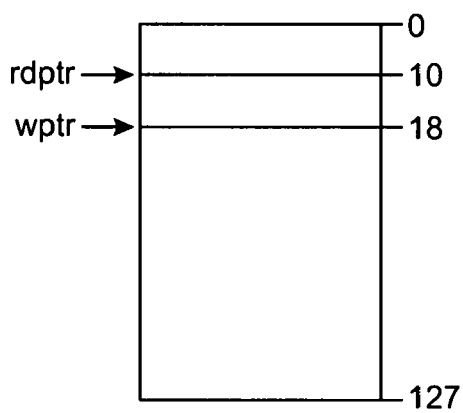
FIG. 5c is a diagram of a conventional FIFO synchronization buffer showing the locations of its write and read pointers just before an underflow condition during synchronization operations.

Similarly, if the rate at which data is being written into FIFO 48 is slower than the rate at which data is being read from FIFO 48, the write pointer will tend to fall behind the read pointer, until the read pointer has almost overtaken the write pointer, as shown in FIG. 5*c*. If the read pointer were to overtake the write pointer, the FIFO would experience underflow and a full FIFO of data would be lost, just as with an overflow condition.

Because data would be lost in the event of buffer overflow or underflow, the overflow and underflow flags are set high whenever the read and write buffers approach each other. If, for example, the write pointer has come within eight memory locations of catching up to the read pointer, as shown in FIG. 5*b*, there is a danger of overflow, so the overflow flag is set high. If the read pointer has come within eight memory locations of catching up to the write pointer, as shown in FIG. 5*c*, there is a danger of underflow, so the underflow flag is set high.

When synchronization FIFO state machine 46 (FIG. 4) detects that the overflow flag has gone high, the synchronization FIFO state machine can either reset the FIFO 48 (e.g., by resetting the write pointer and read pointer locations to their initial default settings as shown in FIG. 5*a*) or can hold the write pointer back. There are typically "idle" characters inserted in each data stream that are normally written into the FIFO. When the synchronization FIFO state machine 46 desires to hold back the write pointer, some of these idle characters can be discarded, rather than being written into the FIFO. Because less data is being written into the FIFO in this situation, the write pointer tends to fall behind the read pointer, thereby eliminating the danger of overflow.

When synchronization FIFO state machine 46 detects that the underflow flag has gone high, the synchronization FIFO state machine can either reset the FIFO (as shown in FIG. 5a) or can hold back the read pointer with respect to the write pointer. For example, idle characters can be inserted into the data being read out from the FIFO while the read pointer is held at a constant location, which will allow the write pointer to catch up to the read pointer.

After passing through the four parallel synchronization FIFOs, the data in each channel has been converted to a common clock domain (i.e., the user-desired system clock). Once the data from each of the channels is operating on the same clock domain, it is said to be synchronized and rate matched. The four sets of synchronized data sdata0-sdata3 are then provided to downstream circuits for additional processing such as 8B10B decoding, MAC processing, etc.

With the conventional approach of FIG. 4, two sets of FIFOs are required to synchronize the clocks and deskew the data for the four parallel channels. The four deskewing FIFOs 40, which are controlled by deskewing FIFO state machine 52, are used to deskew the four incoming data streams. The four synchronization FIFOs 48, which are controlled by synchronization FIFO state machine 46, are used to synchronize the deskewed data.

The sizes of conventional synchronization FIFOs 48 and deskewing FIFOs 40 are selected to accommodate expected worse-case amounts of clock wander and channel misalignment. The sizes of the FIFOs 40 and 48 are fixed, so if a given link has worse-than-expected clock wander, data will be lost, even if the deskew FIFOs 40 are being underutilized due to smaller-than-expected amounts of channel misalignment. Similarly, even if the clocks for each channel are close to each other, so that most of the synchronization space in FIFOs 48 is unused, it will not be possible to deskew the data properly if the misalignment between channels is more than can be handled by the fixed deskewing space of FIFOs 40.

In accordance with the present invention, serial communications circuitry is provided in which a single set of FIFOs is used for both synchronization and deskewing operations. The amount of FIFO space that is used for synchronization functions and the amount of FIFO space used for deskewing functions can be tailored to a particular application.

Figure 7:
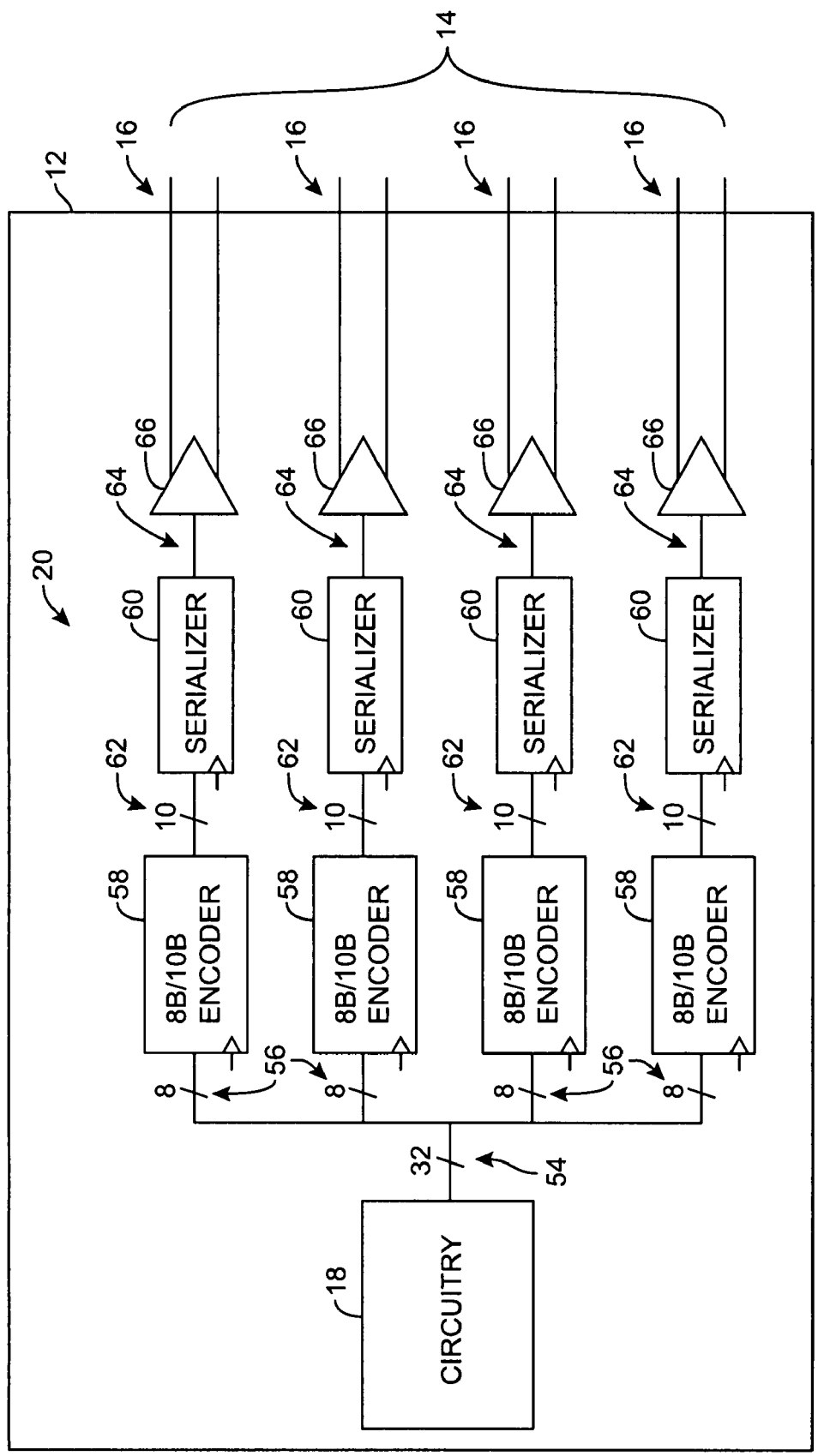
FIG. 7 is a diagram showing illustrative circuitry that may be used to transmit data over four parallel serial paths in accordance with the present invention.
Figure 8:
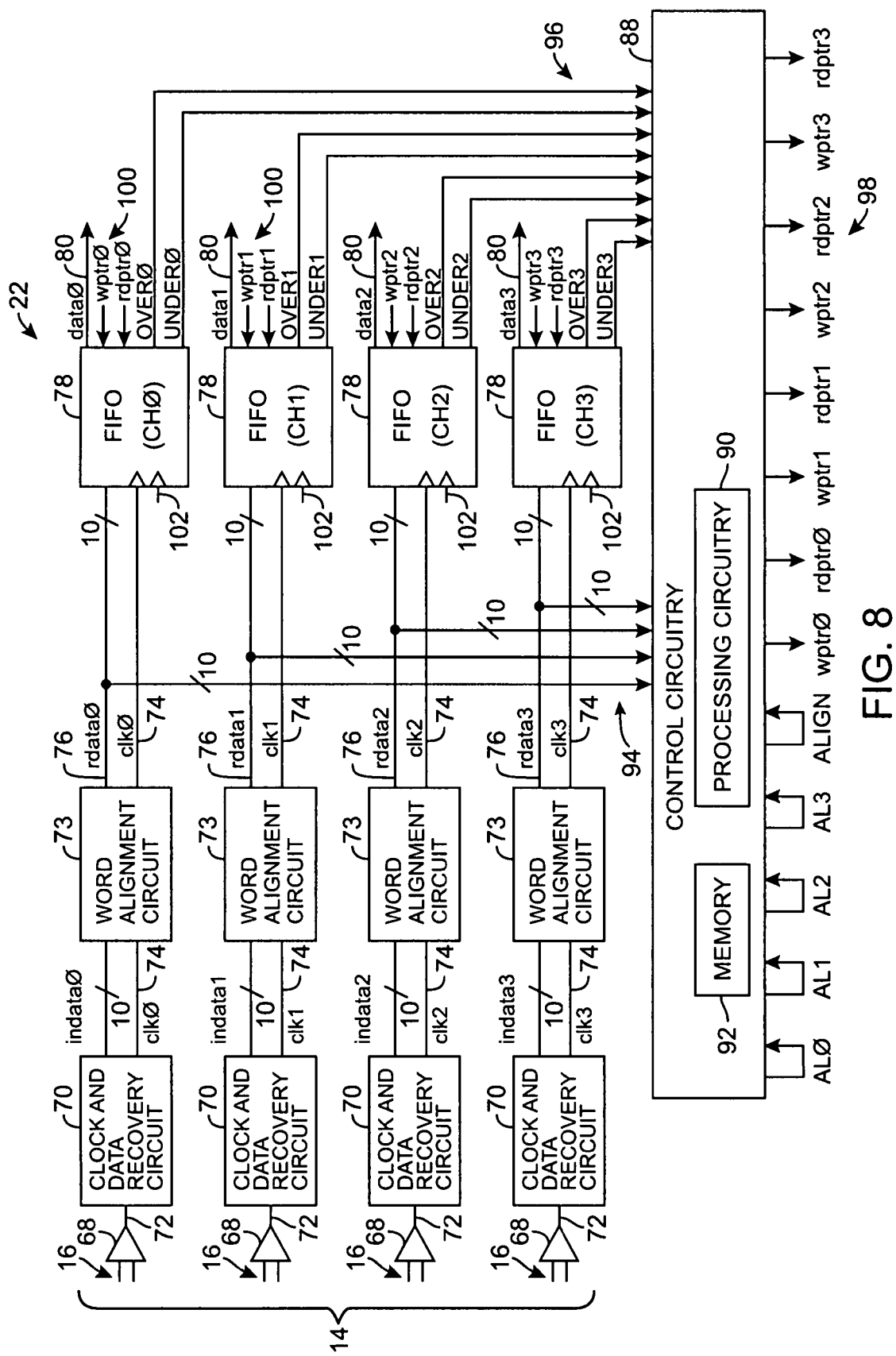
FIG. 8 is a diagram of illustrative circuitry that may be used to receive and deserialize, deskew, and synchronize the signals that have been transmitted over four parallel serial paths using circuitry of the type shown in FIG. 7.
Figure 9:
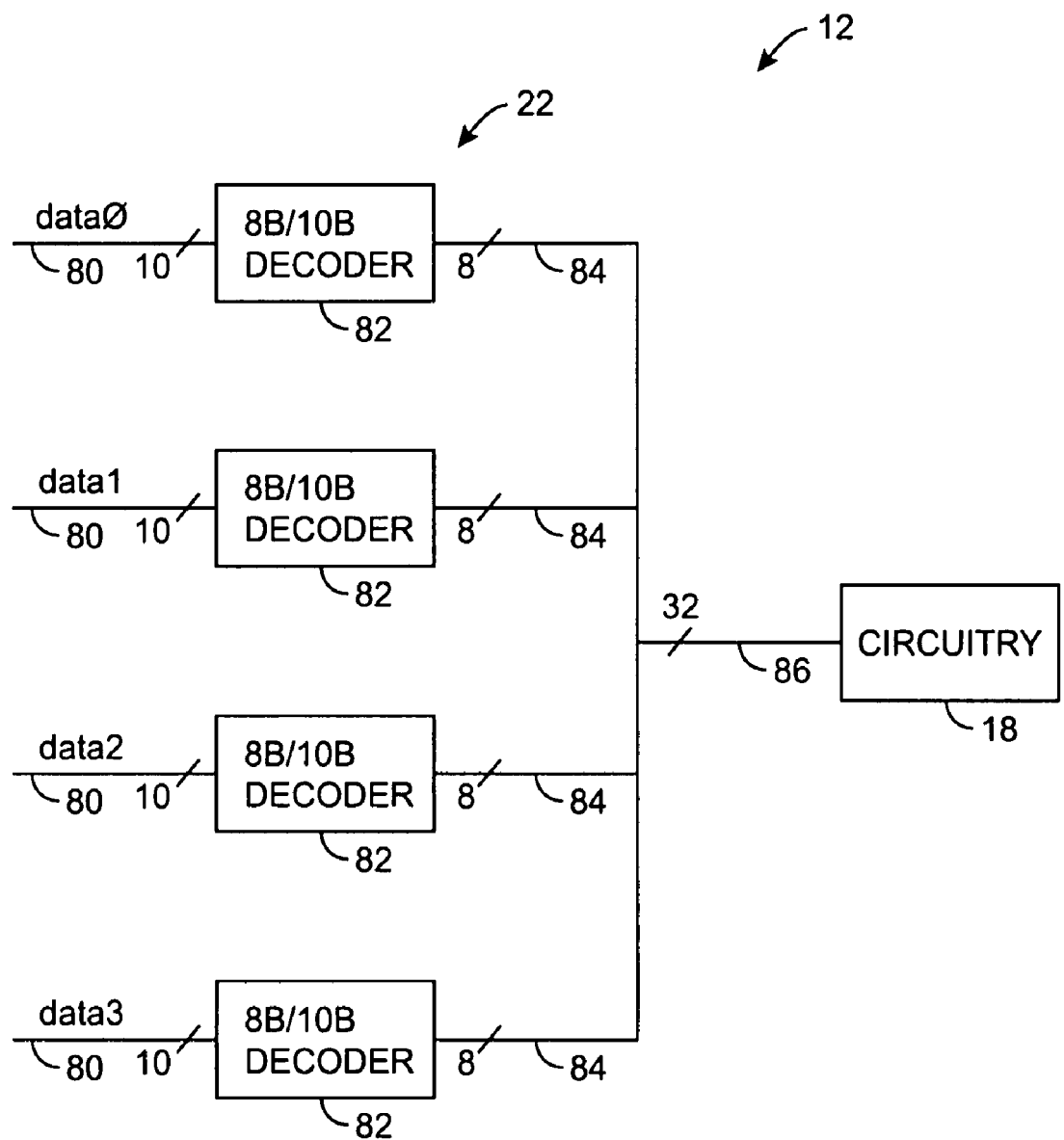
FIG. 9 is a diagram of illustrative circuitry that may be used to decode the data that has been deskewed and synchronized using circuitry of the type shown in FIG. 8.

Illustrative circuitry that may be used by integrated circuits 12 when communicating using multiple parallel serial paths in accordance with the present invention is shown in FIGS. 7, 8, and 9.

As shown in FIG. 7, an integrated circuit 12 that is transmitting data over a serial link 14 formed from parallel serial links 16 may have circuitry 18 that generates digital data. The circuitry 18 may be, for example, digital signal processing circuitry, core logic on a logic chip, user-programmable logic on a programmable logic device or other integrated circuit, digital circuitry on a application-specific integrated circuit, microprocessor or memory circuitry, etc.

Integrated circuits 12 may be used in any suitable electronics equipment and may be used, for example, on circuit boards connected by conductors in a backplane bus and/or conductors in circuit board buses, etc.

If circuits 12 are on circuit boards connected by a backplane, the circuit boards may be mounted in a system rack or installed in another suitable housing. Such circuit boards may be line cards in a telecommunications system, may be circuit boards in a computer, or, may be any other module or submodule in a larger system. If desired, the equipment 10 in which circuits 12 are used need not have a backplane 12, but rather may use a single board or other mount for system components.

Each circuit board or other mounting structure to which circuits such as integrated circuit 12 are mounted typically has a number of integrated circuits and other devices (e.g., switches, discrete components, connectors, etc.). These boards may be made by different vendors and may have different electrical and physical properties. Integrated circuits are typically provided in packages such as dual-inline packages or other suitable packages. Conductive traces (e.g., copper lines on a typical copper circuit board) may be used to electrically interconnect the components mounted on each board.

An integrated circuit such as integrated circuit 12 of FIG. 7 may be, for example, a programmable logic device or a device containing programmable logic circuitry. A programmable logic device contains programmable elements that a user may program to configure the device to perform a desired custom logic function. Some programmable logic devices are based on one-time programmable devices such as fuses or antifuses. Other programmable logic devices are based on electrically-programmable read-only-memory (EPROM) or erasable-electrically-programmable read-only-memory (EEPROM) technology. These devices may be electrically-programmed by applying sufficiently strong signals across appropriate terminals.

Another class of programmable logic device uses random-access-memory (RAM) cells to hold configuration data. The RAM cells may be loaded with configuration data that is provided from an external memory device. For example, when the system is powered-up or at another appropriate time, configuration data from the external memory device may be transferred from the external memory device into the programmable logic device to configure the RAM cells in the programmable logic device. Each of the RAM cells may control a transistor or other element on the programmable logic device, so by configuring the RAM cells, one can selectively turn on and off portions of the circuitry in the programmable logic device and thereby customize its functions as needed.

With one suitable configuration, a programmable logic device containing circuitry 18 and output circuitry 20 of the type shown in FIG. 7 may be loaded with configuration data from an associated external memory device such as an electrically-programmable read-only memory (EPROM) device. This is, however, merely illustrative. Programmable logic devices may be based on any suitable programmable logic device technology.

Moreover, the circuitry 18 and the output circuitry 20 of FIG. 7 may, if desired, be implemented in other types of integrated circuits, such as memory devices, application specific integrated circuits, digital signal processors, microprocessors, analog circuits, digital circuits, communications chips, etc. Such circuits may, for example, be constructed to contain the output driver circuitry of the present invention in combination with the other circuitry used for performing their desired functions (e.g., DSP circuitry on a digital signal processor, microprocessor circuitry on a microprocessor, etc.).

Integrated circuit 12 of FIG. 7 may contain I/O (input-output) circuitry for supporting communications with other system components. Some of the I/O circuitry may be single-ended communications circuitry in which signals are referenced to ground. Other circuitry, particularly high-speed circuitry, may be based on so-called differential signaling arrangements.

In the example of FIG. 7, output circuitry 20 includes circuitry for four lower-speed serial links 16, each of which is used in parallel to support the functions of a higher-speed serial link 14. The use of a high-speed data channel 14 based on a set of four serial links 16 is merely illustrative. In general, integrated circuit 12 may have any suitable number of parallel serial links 16 and these serial links 16 may be used to form any suitable number of aggregated higher-speed serial channels 14. Moreover, integrated circuit 12 may have one or more incoming high-speed channels 14 as well as one or more outgoing high-speed channels 14.

Circuitry 18 may provide digital data for high-speed serial link 14 over any suitable number of data paths. As an example, circuitry 18 may provide data on a 32-bit wide bus 54. The bus 54 may be divided into four parallel 8-bit wide paths 56, each of which feeds a respective encoder 58 coupled to a respective serializer 60. The serializers 60 may take parallel data on inputs 62 and provide corresponding serial data on outputs 64. The outputs 64 may be received by differential output buffers 66. Buffers 66 may drive the serial data for each link over a pair of associated differential signal conductors in each link 16.

In one suitable arrangement for output circuitry 20, a clock signal is embedded into each serial data stream. The embedded clock for each link 16 may then be recovered at the receiver using clock-and-data recovery circuitry.

Encoders 58 may be, for example, 8B/10B encoders that help to generate a sufficient number of data bit signal transitions in the outgoing serial data stream for each link 16 to ensure proper clock recovery at the receiver. The use of encoders such as encoders 58 is merely illustrative. Any suitable outgoing signal processing may be performed on the data streams in each serial channel using circuitry 20 and circuitry 18. For example, error correction circuitry may be used to provide increased noise immunity.

Typically, idle packets (characters) are periodically inserted into the data streams on links 16. The idle packets do not contain critical data, so they can be dropped from the data streams at the receiver when needed to properly reconstruct the serial data for path 14. Alignment characters are also periodically inserted into each stream 16, so that even though these streams are divided as the single bus 54 fans out into the four parallel buses 56, the data from each stream 16 can be properly reconstructed at the receiver. To help ensure clock synchronization and data alignment, the output circuitry 20 may be driven by a common clock signal.

The data from the output circuitry 20 in the integrated circuit 12 of FIG. 7 is conveyed across link 14 and is received by another integrate circuit 12 in the system. Illustrative input circuitry 22 and core circuitry 18 that may be used to at the receiving integrated circuit 12 is shown in FIGS. 8 and 9. In these FIGS., the input circuitry 22 is shown in two parts—part is shown in FIG. 8 and part is shown in FIG. 9.

The portion of the illustrative input circuitry 22 that is shown in FIG. 8 has a differential input buffer 68 for receiving differential signals on each serial link 16. The output of each buffer 68 is provided to a respective clock and data recovery circuit 70 over a corresponding path 72.

Clock and data recovery circuits 70 contain phase-lock-loop circuitry for recovering the embedded clock signal and data from each incoming data stream. Each clock and data recovery circuit 70 processes the incoming data from a respective one of the serial data paths 16 and generates a corresponding recovered data signal (e.g., indata0 for channel 0, indata1 for channel 1, etc.). The recovered data is word aligned using word alignment circuits 73 to produce corresponding recovered and word-aligned data streams (e.g., rdata0 for channel 0, rdata1 for channel 1, etc.) on a recovered and word-aligned data line 76.

Each clock and data recovery circuit 70 provides the clock that has been recovered from the incoming data stream on a corresponding recovered clock line 74. The recovered and word-aligned data signals on lines 76 and the recovered clocks on lines 74 are provided to a set of four first-in-first-out (FIFO) buffers 78 (also sometimes referred to as "FIFO"). FIFO 78 performs both clock synchronization and deskewing operations on the four data streams 16 and provides corresponding synchronized and deskewed (aligned) data at four corresponding outputs 80 (labeled data0, data1, data2, and data3 in FIG. 8).

The data on lines 80 may be provided to decoders such as 8B/10B decoders 82, as shown in FIG. 9. Following 8B/10B decoding, the 8-bit-wide data signals data0-data3 on buses 84 can be combined to form a single 32-bit-wide data stream on bus 86. The 32-bit-wide signal received by the integrated circuit's circuitry 18 on bus 86 matches the 32-bit-wide signal that was transmitted by circuitry 18 of FIG. 7 over bus 54.

As shown in FIG. 8, the process of synchronizing and deskewing the incoming data streams on channels 16 is controlled by control circuitry 88. Control circuitry 88 may include hard-wired and/or software-configured processing circuitry 90 and memory 92 or other suitable circuitry (e.g., programmable logic circuitry, etc.) that is used to implement a synchronization and deskewing state machine. During alignment operations, the control circuitry 88 monitors the recovered data rdata0-rdata3 from clock and data recover circuitry 70 and word alignment circuits 73 via input lines 94.

The control circuitry 88 also monitors the states of overflow and underflow flags generated by FIFO 78. These flags are monitored by control circuitry 88 using lines 96. Control circuitry 88 controls the operation of FIFO 78 by generating read pointers rptr0-rptr3 and write pointers wptr0-wptr3. The values of the read and write pointers that are generated by the control circuitry 88 are provided at read and write pointer outputs 98 and are received by the FIFO buffers 78 via corresponding read and write pointer inputs 100. Because the synchronization and deskewing operations of input circuit 22 are performed using a single set of FIFO (i.e., one FIFO buffer 78 for each serial channel 16), only a single set of read and write pointers need to be generated by control circuitry 88.

During writing operations, each FIFO 78 is clocked using a corresponding one of the recovered clocks. For example, during writing operations, the FIFO 78 for channel 0 may be clocked using the recovered clock signal CLK0. The FIFO 78 for channel 1 may be written to using CLK1, etc.

A single common clock is used to extract data from all FIFOs 78. This clock, which is applied to FIFOs 78 via terminals 102 may be, for example, a local clock that is selected from one of the recovered clocks (e.g., recovered clock CLK2 may be used as the local clock). Regardless of the source used for the clock, the clock is preferably used for all circuitry downstream of the clock and data recovery circuits 70 and FIFOs 78.

The memory resources of FIFOs 78 are used for both synchronization functions and deskew functions. The portion of the FIFOs 78 that is used for synchronization functions is referred to as "synchronization space." The synchronization space can be divided into two parts—one for handling potential underflow situations (the "underflow space") and another for handling potential overflow situations (the "overflow space"). The portion of FIFOs 78 that is used for deskewing functions is referred to as the "deskew space."

The FIFOs 78 may be partitioned dynamically. If paths 16 are subject to large amounts of clock wander, more FIFO resources can be allocated to synchronization functions (i.e., the synchronization space may be made larger). If the paths 16 produce large channel misalignments, more FIFO resources can be allocated to deskewing functions (i.e., the deskewing space may be made larger).

Because the total number of memory slots in the FIFO is fixed (for a given design), the sizes of the synchronization space and deskewing space must be balanced against each other. Accordingly, the size of FIFO 78 is preferably selected so that it can handle the worst-case scenario where maximum synchronization and maximum deskewing functions are needed simultaneously.

Generally, worst-case synchronization and worst-case deskewing scenarios do not arise simultaneously. An advantage of using a single set of FIFOs to handle both synchronization and deskewing functions in these circumstances is that the FIFO can be partitioned to optimize the balance of synchronization and deskewing capabilities for input circuitry 22 depending on the situation. If only a few memory slots are needed in FIFO 78 to support deskewing operations because there is relatively little channel misalignment between paths 16, more memory slots will be available to handle synchronization operations. If the clocks on the various channels are close to each other (i.e., if there is a small amount of clock wander among channels 16), more FIFO memory slots can be used for channel deskewing.

The flexibility provided by the ability to partition FIFO 78 to create a desired amount of synchronization space and a desired amount of deskewing space may allow the size of FIFO 78 to be smaller than the combined sizes of conventional FIFOs such as deskewing FIFOs 40 and synchronization FIFOs 48 of FIG. 4 while maintaining the same level of synchronization and deskewing performance or may allow the same amount of synchronization and deskewing performance to be provided while using fewer FIFO resources. Resource usage is also minimized because less circuitry is needed to handle a single set of read pointers and write pointers than would be required to handle one set of read/write pointers for synchronization and another set of read/write pointers for deskewing.

Figure 10:
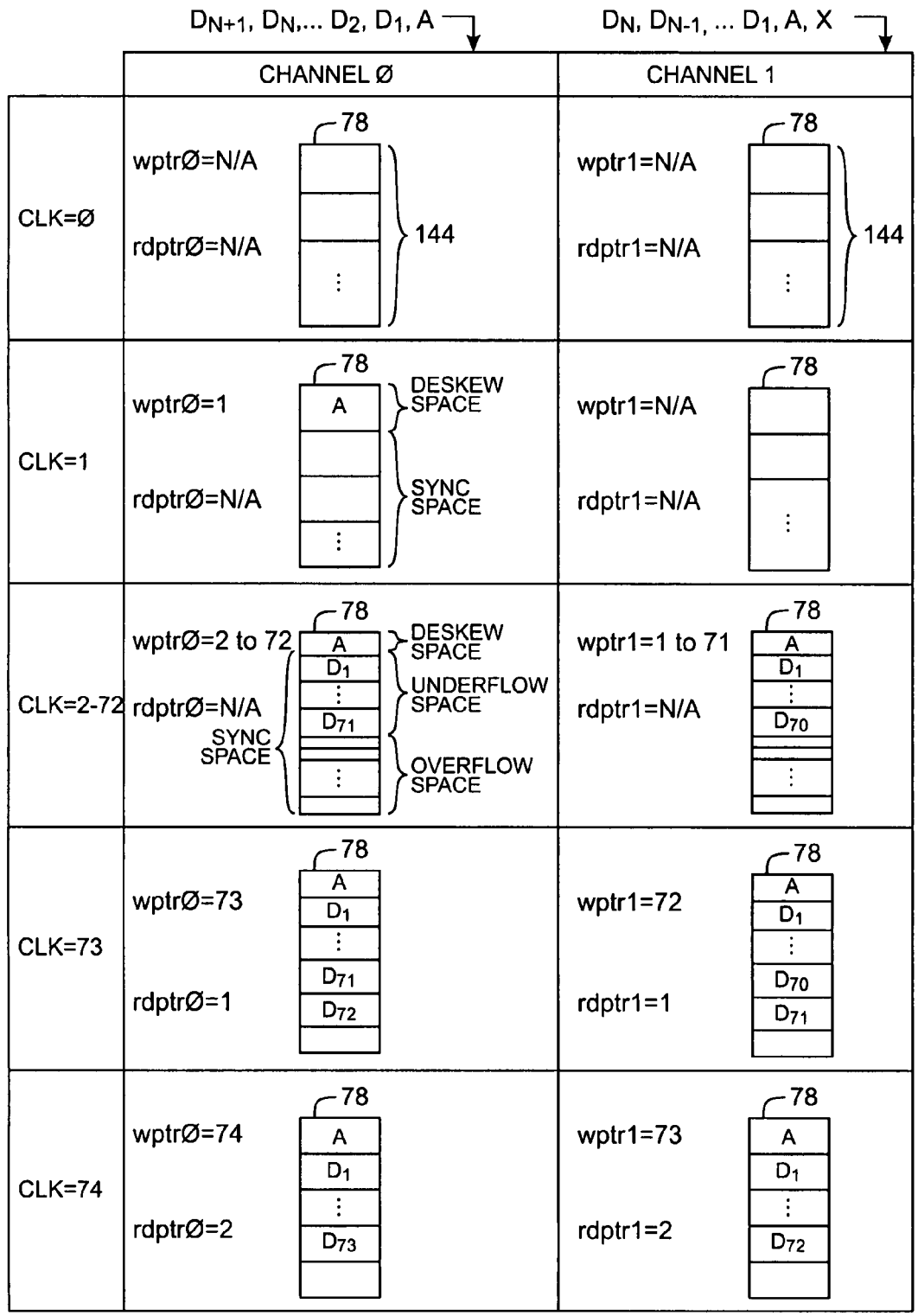
FIG. 10 is a diagram showing how one set of FIFO buffers can be used to handle both deskewing and synchronization functions in accordance with the present invention.

The synchronization and deskewing operations of the circuitry of FIG. 8 are illustrated in FIG. 10. In the illustrative example of FIG. 10, only two channels (ch0 and ch1) out of the four illustrative channels (ch0, ch1, ch2, and ch3) are shown as being synchronized and deskewed to avoid overcomplicating the drawing. In general, the entire set of parallel lower-speed serial channels 16 that are being used to provide the serial data carrying capacity of a larger aggregated serial channel 14 are synchronized and aligned.

The table of FIG. 10 has two columns. The first column shows the state of the FIFO 78 that is associated with the first channel 16 (i.e., ch0). The second column shows the state of the FIFO 78 that is associated with a second channel 16 (i.e., ch1). The rows of the table correspond to different clock cycles. In the first row, the local clock CLK=0. In subsequent rows the local clock is incremented. For example, in the second row the clock has advanced by one clock cycle, so that the local clock in row 2 is CLK=1.

As shown just above the first column of the table in FIG. 10, ch0 is receiving a stream of data characters A, D1, D2, . . . . The character A is an alignment character that output circuitry 20 of FIG. 7 inserts into the data streams of each channel 16 for use in reconstructing the data at the receiver. The other information received in ch0 is data (e.g., a first 10-bit piece of data D1, a second 10-bit piece of data D2, etc.)

As shown just above the second column of the table of FIG. 10, the data stream received in ch1 is not aligned with the data stream received in ch0. In particular, when ch0 is receiving the alignment character A, no alignment character (represented as "X") is received in ch1. By the time the alignment character A is received in ch1, data D1 is being received in ch0, etc.

In the illustrative situation of FIG. 10, ch0 is therefore ahead of ch1 by one cycle (i.e., there is a one-cycle skew between these two channels).

As shown in the first row of the table, the FIFOs for both channels are initially empty. The size of the illustrative FIFOs in the example of FIG. 10 is 144 memory slots. A FIFO of this size has the same total number of memory slots as a conventional two-FIFO arrangement in which the synchronization FIFO has 128 memory slots and the deskew FIFO has 16 memory slots.

However, because FIFOs 78 can be partitioned dynamically, the unused deskewing capabilities of the 144-slot FIFOs 78 can be dynamically reallocated to handling synchronization functions. In the example of FIG. 10, only one FIFO slot is used for deskewing, so 143 slots are available for synchronization. With the illustrative conventional arrangement, in contrast, 15 deskewing FIFO memory slots would go unused and the synchronization space would be limited to only 128 memory slots. Thus, even though the 144 memory slots of FIFO 78 are no larger than the combined 128+16 memory slots used in the illustrative conventional example, performance is enhanced. If desired, a comparable level of performance could be maintained and the amount of FIFO 78 used for deskewing and synchronization could be reduced.

In the initial state of the first row of the table of FIG. 10 (CLK=0), the FIFO 78 in ch0 and the FIFO 78 in ch1 are both idle. No data has been written into FIFO 78 and the FIFO has not been partitioned. Because no data has been written or read from the FIFO, the values of the read pointers and write pointers rdptr0, rdptr1, wptr0, and wptr1 are not defined at CLK=0.

As shown in the second row of the table, at CLK=1, the alignment character A has been received in ch0 and has been written into the FIFO 78 for ch0. Accordingly wptr0=1. Data has not yet been received in ch1, so ch1 remains idle and wptr1 remains undefined. The FIFO 78 for ch1 is empty. Because the channels ch0 and ch1 are not yet aligned, no reading from the FIFO 78 for either ch0 or ch1 has taken place and the value of both of the read pointers is still undefined.

During cycles such as the cycle of CLK=1, the control circuitry 88 (FIG. 8) is allocating the deskewing space in FIFO 78. In this example, the data of ch1 and ch0 are only misaligned by a single clock cycle, so only one slot of memory space is allocated to deskewing (i.e., the deskew space has a size of one memory location in this example). The remaining memory slots in FIFO are allocated to synchronization space. If there were a larger misalignment between channels, the allocation of deskewing space would continue and the deskewing space would grow larger (and the synchronization space would shrink proportionally) until alignment is achieved. The amount of FIFO used for deskewing and synchronization are therefore not hard-wired, but are partitioned dynamically.

When CLK=2, the alignment character A for ch1 is received and is stored in the FIFO 78 for ch1 (i.e., wptr1=1). At the same time that the alignment character A is being written into the FIFO for ch1, data D1 is written into the FIFO for ch0 (i.e., wptr0=2). Because there is a skew of one clock cycle between ch0 and ch1 in this example, the write pointer for ch0 is always one cycle ahead of the write pointer for ch1. The read pointers for both FIFOs 78 remain undefined at CLK=2.

From CLK=2 to CLK=72 (in this example), the control circuit is filling the underflow space in FIFOs 78. In this example, the amount of space available for synchronization (143) is equal to the total FIFO size of 144 minus the amount of FIFO space used for deskewing (which is 1). As described in connection with FIG. 5a, the synchronization space may be divided into two equal (or approximately equal) halves. One half may be used as underflow space and the other half may be used as overflow space. Half of 143 (rounded to an integer value) is 71, so control circuitry 88 can allocate 71 slots of the synchronization space in FIFO 78 to underflow space and 72 slots of the synchronization space in FIFO 78 to overflow space during the partitioning process.

Dividing the synchronization space into two equal (or nearly equal) parts is merely one illustrative way in which to allocate the synchronization space in FIFOs 78. Any suitable FIFO allocation scheme may be used if desired. Moreover, the way in which the synchronization space is allocated (e.g., the amount of synchronization space allocated to underflow relative to overflow, the amount of synchronization space that is allocated in FIFO relative to the size of deskewing space, etc.) may be selected by a user (e.g., a system designer). As an example, the user may instruct control circuitry 88 that deskewing space or synchronization space must always include a minimum number of memory slots, the user may instruct control circuitry that the synchronization space must be divided (as near as possible) into equal overflow and underflow spaces, the user may instruct the control circuitry that the underflow space must exceed a certain minimum threshold size, etc.

During underflow (and overflow) space allocation (CLK=2 to 72), the ch0 data values D1 to D71 are written into the FIFO 78 for ch0. Ch1 is one cycle behind ch0, so the ch1 data values of D1 to D70 are written into the FIFO 78 for ch1. During writing, wptr0=2 to 72 and wptr1=1 to 71. The synchronization space has not yet been fully partitioned during this time, so the value of the read pointers remains undefined.

At clock cycle CLK=73, partitioning is complete. Accordingly the read pointers rdptr0 and rdptr 1 may be set to 1 and reading may be initiated. At clock cycle CLK=74, the read pointers are incremented (i.e., rdptr0=2 and rdptr1=2). This process continues during subsequent clock cycles. Data is written into FIFOs 78 by incrementing the write pointers appropriately. Data is read from the FIFOs 78 by incrementing the read pointers according to the local clock CLK. During reading operations, the data stream read from the FIFO associated with ch0 produces the synchronized and deskewed data stream data0 (FIGS. 8 and 9). The data stream read from the FIFO in ch1 produces the synchronized and deskewed data stream data1 (FIGS. 8 and 9). Data streams data2 and data3 are produced by the FIFOs for ch2 and ch3 (FIG. 8).

Channel skew may vary with time. For example, channels ch0 to ch3 may initially be misaligned by 5 clock cycles. Later, the misalignment may drop to 2 clock cycles. Control circuitry 88 can vary the partitioning of FIFOs 78 dynamically to accommodate such changes in channel skew. If the skew drops from 5 to 3 clock cycles, for example, the control circuitry 88 can use the process of FIG. 10 to allocate 2 additional memory slots in FIFO to synchronization space. Because the deskew space and synchronization space form part of the same physical FIFO, FIFO space that is not used for deskewing can automatically be used for synchronization functions and need not be wasted.

If necessary, the control circuitry 88 can reset the FIFOs or use idle characters to adjust the spacing between the read pointers and write pointers in the FIFOs 78. This prevents potential overflow or underflow conditions from arising.

Figure 11:
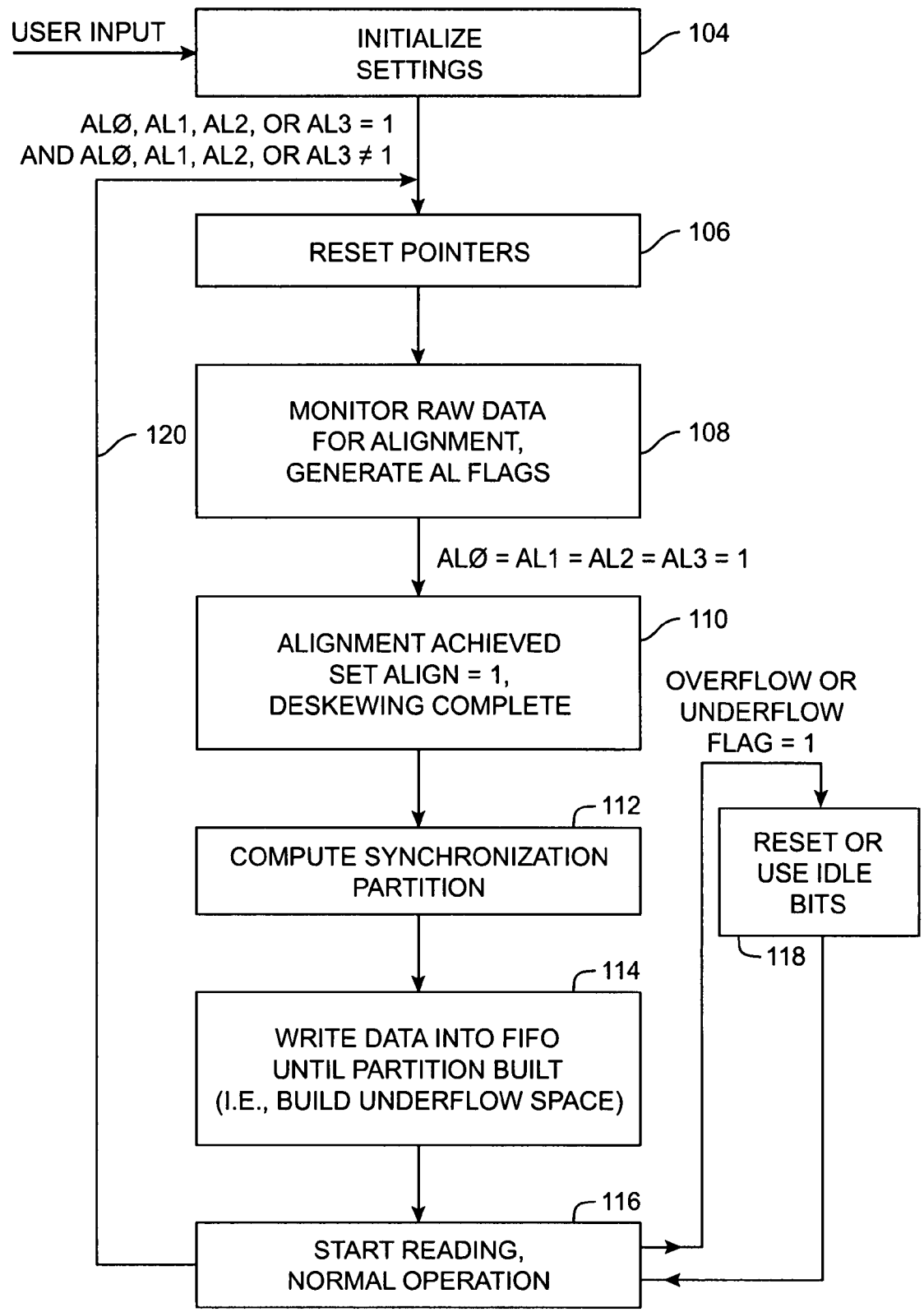
FIG. 11 is a diagram showing steps involved in using circuitry of the type shown in FIGS. 8 and 9 to deskew and synchronize data from multiple serial data streams in accordance with the present invention.

Illustrative steps involved in using combined synchronization/deskewing FIFO arrangement of the present invention to synchronize and deskew data from multiple parallel serial channels 16 that make up a serial link 14 are shown in FIG. 11.

At step 104, settings may be initialized. For example, user-defined or default settings for the minimum allowed distances between read pointers and write pointers, user-defined or default settings for permitted sizes (e.g., minimum threshold sizes) for the deskewing space, synchronization space, underflow space, or overflow space, or user-defined or default settings for other synchronization and deskew functions may be provided. Users may provide settings and other information to control circuitry 88 using any suitable technique. For example, settings may be provided to memory 92 (e.g., one or more registers or other memory on a circuit 12).

At step 106, the read pointers and write pointers may be reset by control circuit 88. For example, the read and write pointers may initially be set to an "undefined" state, as described in connection with clock cycle CLK=0 in FIG. 10.

At step 108, the control circuit 88 may monitor the recovered data rdata0, rdata1, rdata2, and rdata3 from clock and data recovery circuits 70 using lines 94. When an alignment character A is detected in a particular channel, the control circuitry 88 may set the alignment flag for that channel to 1 (as an example). The control circuitry 88 may also fill the deskewing space of FIFOs 78 as described in connection with FIG. 10. Once alignment characters A have been detected in each channel (i.e., once flags AL0, AL1, AL2, and AL3 are all 1), alignment has been achieved and the initial partitioning of FIFO resources between deskewing and synchronization functions is complete. The control circuit 88 may therefore set the flag ALIGN to 1 (step 110).

At steps 112 and 114, the control circuit 88 can partition the synchronization space between underflow space and overflow space, as described in connection with FIG. 10. During underflow and overflow space partitioning, the control circuitry 88 may use the user-defined and/or default settings of step 104. For example, underflow space size may be determined by writing data into FIFO until a desired minimum underflow space threshold has been exceeded, etc. If desired, an appropriate partition between the underflow and overflow spaces may be calculated at step 112 (e.g., by dividing the synchronization space in two). With this approach, the control circuitry can write data into the FIFO at step 114 until the calculated partition has been achieved.

After the underflow buffer has been constructed at step 114, the control circuitry 88 can increment the read pointers, as described in connection with rows 4 and 5 of the table of FIG. 10. During the normal operation of step 116, control circuit 88 performs write operations into FIFOs 78 according to the recovered clocks in each channel 16 (e.g., according to clk0, clk1, clk2, and clk3 in the example of FIG. 8). FIFO read operations are performed according to the local clock CLK applied to terminals 102.

Differences between the recovered clocks and the local clock may cause the FIFOs to be at risk of overflowing or underflowing. If the read pointers and write pointers become too close to each other, FIFOs 78 may set underflow flags or overflow flags accordingly. The control circuitry 88 monitors the underflow and overflow flags for each FIFO 78 via one of paths 96.

If a potential underflow or overflow condition arises (i.e., if an underflow or overflow flag is set high), the control circuitry can correct the situation at step 118. For example, the control circuitry 88 may reset the read and write pointers. If the write pointer is in danger of overflowing the read pointer, the control circuitry 88 may hold back the write pointer with respect to the read pointer (e.g., by discarding idle characters from the appropriate incoming data stream). If the read pointer is in danger of overtaking the write pointer (i.e., an underflow condition), the read pointer can be slowed with respect to the write pointer by inserting idle characters into the outgoing data stream without incrementing the read pointer.

After the potential overflow or underflow condition has been corrected at step 118, the overflow and underflow flags are all reset and normal operation continues at step 116.

If a misalignment is detected during normal operation, operations can return to step 106, as shown by line 120. Control circuitry 88 can detect misalignment (skew) between channels by monitoring the status of the "AL" flags. When the channels are all properly aligned, alignment characters are received at the same time (i.e., AL0=AL1=AL2=AL3=1 all at the same time). If, however, the channels are misaligned, at least one of the alignment characters A will be received in advance of or behind the other alignment characters. Control circuitry 88 can therefore conclude that there is channel misalignment whenever one or more the AL flags are high at the same time that one or more of the AL flags are low. If this condition is detected, the pointers may be reset at step 106 and the deskewing process described in connection with step 108 and row 2 of the table of FIG. 10 may be performed.

Figure 12:
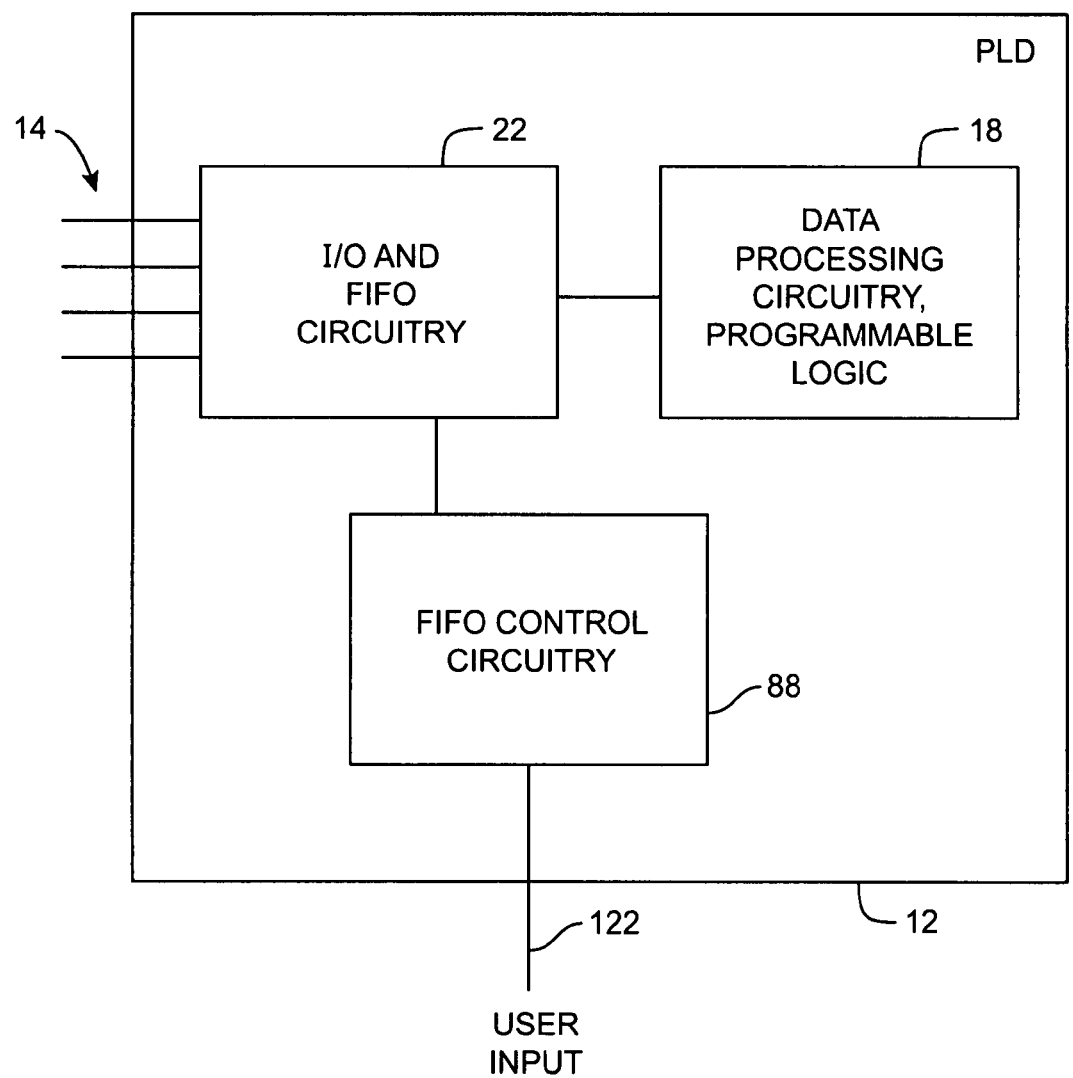
FIG. 12 is a diagram of an illustrative integrated circuit showing how user-supplied information may be used to generate control signals that dynamically partition FIFO buffer circuitry to accommodate a desired balance between deskewing capacity and synchronization capacity in accordance with the present invention.

As described in connection with step 104, a user of an integrated circuit containing control circuitry such as control circuitry 88 of FIG. 8 may be provided with an opportunity to adjust certain settings. For example, as shown in FIG. 12, a user of a programmable logic device integrated circuit 12 or other suitable integrated circuit may provide user input for control circuitry 88 via one or more input paths such as path 122. With one illustrative arrangement, the user input may be provided by loading data into configuration bits, registers, or other memory on circuit 12. When control circuitry 88 operates, this user-specified information and/or default information may be used to determine how to partition the FIFOs and otherwise control the operation of the input circuitry 22.

The foregoing is merely illustrative of the principles of this invention and various modifications can be made by those skilled in the art without departing from the scope and spirit of the invention.

What is claimed is:

1. A method of using a single set of first-in-first-out buffers on an integrated circuit to synchronize and deskew data received from multiple serial data streams, comprising:
   deskewing the multiple serial data streams by writing data from each of the multiple serial data streams into a respective one of the first-in-first-out buffers only after an alignment character has been detected in that serial data stream;
   dynamically partitioning at least a given one of the first-in-first-out buffers into a deskew space and a synchronization space by writing the data from the serial data stream associated with that given first-in-first-out buffer into one or more slots in the given first-in-first-out buffer while all remaining slots in the given first-in-first-out buffer are allocated to the synchronization space;
   dynamically partitioning the synchronization space between underflow space and overflow space;
   synchronizing the multiple serial data streams by reading deskewed data from each of the respective first-in-first-out buffers using a common clock;
   decoding the multiple serial streams with 8B/10B decoder circuitry that receives the synchronized and deskewed versions of the multiple serial data streams from the single set of first-in-first-out buffers, wherein the integrated circuit comprises programmable logic; and
   providing the synchronized, deskewed, and decoded data from the multiple serial data streams to the programmable logic on the integrated circuit.

2. The method defined in claim 1 wherein each first-in-first-out buffer has an associated write pointer and an associated read pointer, the method further comprising generating overflow and underflow flags with the first-in-first-out buffers based on the location of the write pointers with respect to the read pointers.

3. The method defined in claim 1 wherein each of the first-in-first-out buffers has an associated write pointer and an associated read pointer, the method comprising:
   writing data from the multiple serial data streams into the first-in-first-out buffers using the write pointers, wherein at least two of the write pointers point to different memory slots during writing; and
   reading the deskewed data from the first-in-first-out buffers using the read pointers, wherein during a given clock cycle of the common clock, each of the read pointers points to the same memory slot in each of the associated first-in-first-out buffers.

4. The method defined in claim 1 further comprising:
   using clock and data recovery circuitry to extract a recovered clock and recovered data from each of the multiple serial data streams; and
   using the recovered clock from each serial data stream to write data into its respective first-in-first-out buffer.

5. A method of using first-in-first-out buffers on an integrated circuit to synchronize and deskew data received from multiple serial data streams, comprising:
   dynamically partitioning at least a given one of the first-in-first-out buffers into a deskew space and a synchronization space by writing the data from the serial data stream associated with that given first-in-first-out buffer into one or more slots in the given first-in-first-out buffer while all remaining slots in the given first-in-first-out buffer are allocated to the synchronization space;
   dynamically partitioning the synchronization space between underflow space and overflow space;
   deskewing and synchronizing the data from the multiple serial data streams using only a single write pointer for each of the serial data streams to write data into the first-in-first-out buffer circuitry and using only a single read pointer for each of the serial data streams to read data from the first-in-first-out buffer circuitry;
   decoding the multiple serial streams with 8B/10B decoder circuitry that receives the deskewed and synchronized versions of the multiple serial data streams from the first-in-first-out buffers, wherein the integrated circuit comprises programmable logic; and
   providing the deskewed, synchronized, and decoded data from the multiple serial data streams to the programmable logic on the integrated circuit.

6. The method defined in claim 5 further comprising partitioning the first-in-first-out buffer circuitry into deskew space and synchronization space in accordance with user input.

7. A set of circuits on an integrated circuit for synchronizing and deskewing multiple serial data streams, comprising:
   a plurality of first-in-first-out buffers, each first-in-first-out buffer being associated with a respective one of the multiple serial data streams;
   8B/10B decoder circuitry that receives the synchronized and deskewed versions of the multiple serial data streams from the first-in-first-out buffers, wherein the integrated circuit comprises a programmable logic device; and
   control circuitry that controls the first-in-first-out buffers so that each first-in-first-out buffer performs both synchronization and deskewing operations on its respective serial data stream, wherein the control circuitry is configured to:

dynamically partition at least a given one of the first-in-first-out buffers into a deskew space and a synchronization space by writing the data from the serial data stream associated with that given first-in-first-out buffer into one or more slots in the given first-in-first-out buffer while all remaining slots in the given first-in-first-out buffer are allocated to the synchronization space; and dynamically partition the synchronization space between underflow space and overflow space.

8. The set of circuits defined in claim 7 further comprising a clock and data recovery circuit associated with each serial data stream that produces a recovered clock and recovered data from that data stream, wherein the recovered clock from each serial data stream is used to write the recovered data from that serial data stream into the first-in-first-out buffer associated with that serial data stream.

9. The set of circuits defined in claim 7 wherein each first-in-first-out buffer comprises an input that receives data from its associated serial data stream and comprises an output, and wherein the outputs of the first-in-first-out buffers provide synchronized serial data streams that are deskewed with respect to each other.

10. The set of circuits defined in claim 7 further comprising decoder circuitry, wherein synchronized and deskewed data is provided to the decoder circuitry from the first-in-first-out buffers.

11. A set of circuits in which serial data is communicated over a plurality of serial data links, comprising:

a first integrated circuit having:
circuitry for generating digital signals;
a plurality of serializers for serializing the digital signals and providing a corresponding plurality of serial data streams; and
a plurality of corresponding differential output buffers connected to the serializers that transmit the serial data streams;

a second integrated circuit having:
a plurality of differential input buffers that receive the transmitted serial data streams;
a plurality of clock and data recovery circuits, each connected to a respective one of the differential input buffers for receiving a respective one of the serial data streams and for providing corresponding recovered data from the serial data streams and recovered clock signals from the serial data streams;
a plurality of word-alignment circuits, each of which receives the recovered data and recovered clock signals from a respective one of the clock and data recovery circuits and that provides a corresponding word-aligned data signal;
a plurality of first-in-first-out buffers that receive the recovered clock signals, wherein each of the first-in-first-out buffers receives the word-aligned data signal from a respective one of the word-alignment circuits and provides a corresponding data output signal and wherein the data output signals from the first-in-first-out buffers are synchronized and deskewed versions of the multiple serial data streams;
8B/10B decoder circuitry that receives the synchronized and deskewed versions of the multiple serial data streams from the first-in-first-out buffers, wherein the second integrated circuit comprises a programmable logic device; and
control circuitry that controls the first-in-first-out buffers so that each first-in-first-out buffer performs both synchronization and deskewing operations on its respective word-aligned data signal, wherein the control circuitry is configured to:

dynamically partition at least a given one of the first-in-first-out buffers into a deskew space and a synchronization space by writing data into one or more slots in the given first-in-first-out buffer while all remaining slots in the given first-in-first-out buffer are allocated to the synchronization space; and dynamically partition the synchronization space between underflow space and overflow space.

12. The set of circuits defined in claim 11 further comprising control circuitry that directs each first-in-first-out buffer to perform both synchronization and deskewing operations using only a single write pointer and a single read pointer.

* * * * *